Feb. 20, 1962 J. W. BARNSTEAD 3,021,873
METHOD OF MAKING WIRE RACKS
Original Filed June 20, 1957 5 Sheets-Sheet 1

INVENTOR.
JOHN W. BARNSTEAD
BY
T.B. Dysart
HIS ATTORNEY

Feb. 20, 1962    J. W. BARNSTEAD    3,021,873
METHOD OF MAKING WIRE RACKS
Original Filed June 20, 1957    5 Sheets-Sheet 2
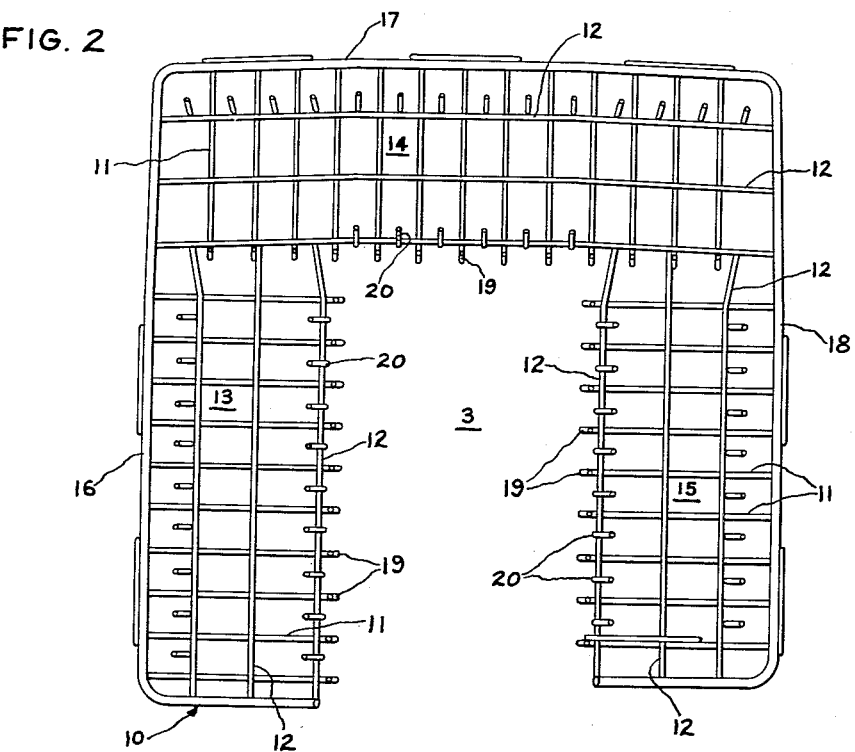
FIG. 2
FIG. 3
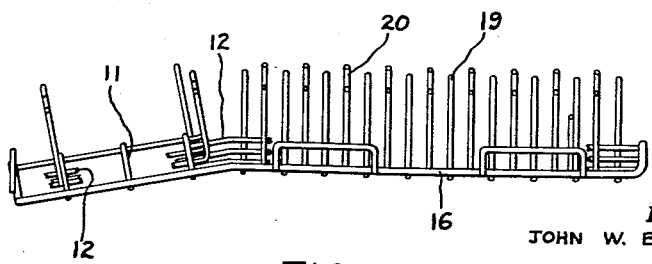
FIG. 4
INVENTOR.
JOHN W. BARNSTEAD
BY
T.G. Dysart
HIS ATTORNEY Feb. 20, 1962  J. W. BARNSTEAD  3,021,873
METHOD OF MAKING WIRE RACKS
Original Filed June 20, 1957  5 Sheets-Sheet 3

INVENTOR.
JOHN W. BARNSTEAD
BY T. G. Dupont
HIS ATTORNEY

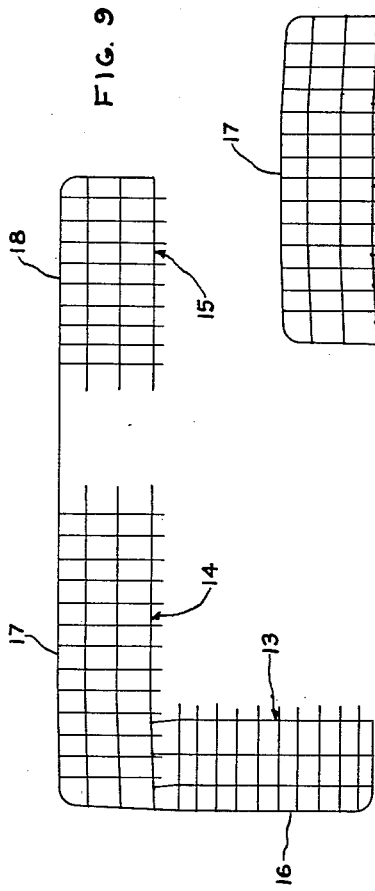

Feb. 20, 1962     J. W. BARNSTEAD     3,021,873
METHOD OF MAKING WIRE RACKS
Original Filed June 20, 1957     5 Sheets-Sheet 5
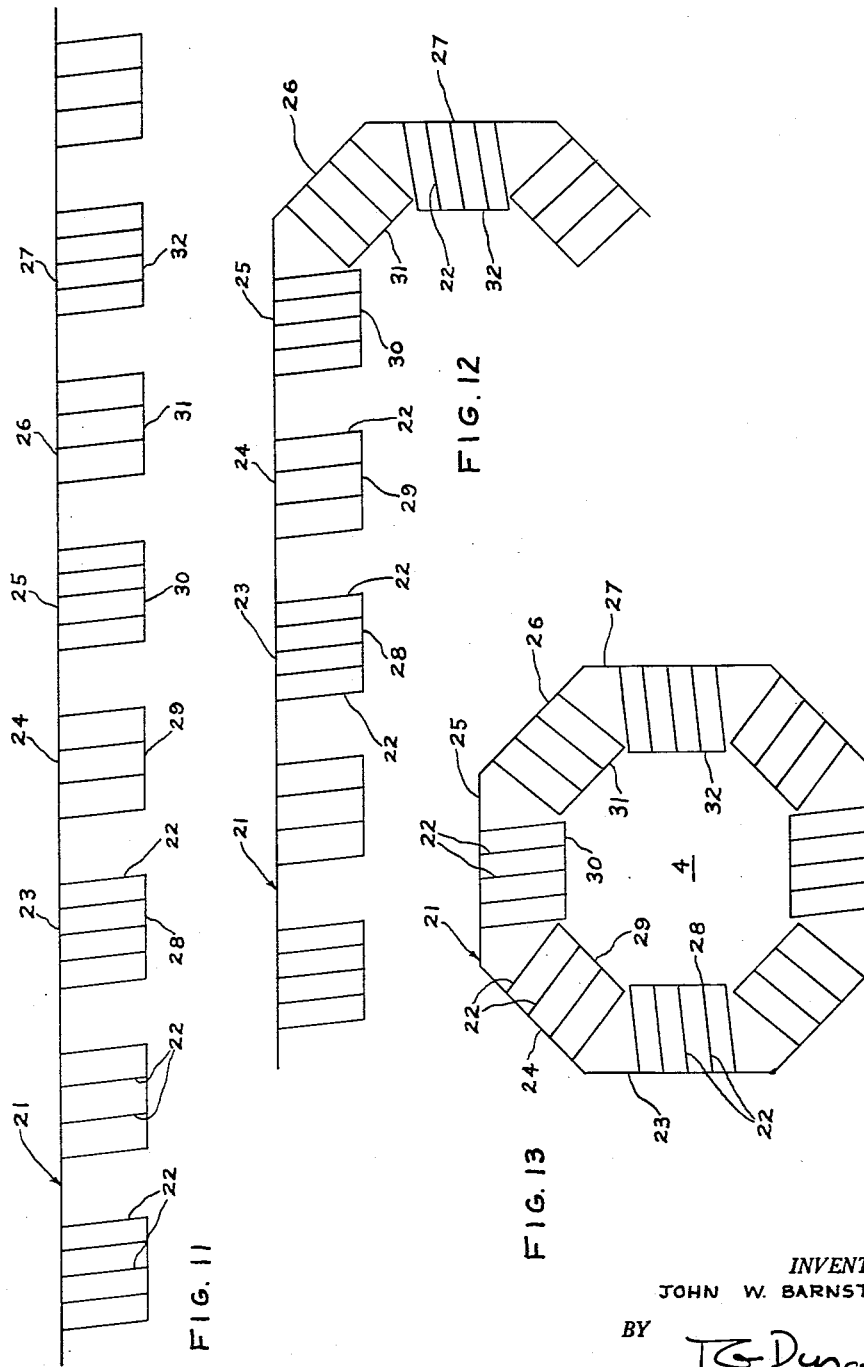
INVENTOR.
JOHN W. BARNSTEAD
BY T.G. Dypart
HIS ATTORNEY United States Patent Office 3,021,873
Patented Feb. 20, 1962

3,021,873
METHOD OF MAKING WIRE RACKS
John W. Barnstead, Louisville, Ky., assignor to General Electric Company, a corporation of New York
Original application June 20, 1957, Ser. No. 666,869. Divided and this application July 28, 1958, Ser. No. 751,538
6 Claims. (Cl. 140—71)

This invention relates to a method of making wire racks, such as the racks employed in dishwashers for supporting articles to be washed. The present application is a division of my application Serial No. 666,869 filed June 20, 1957, assigned to the assignee of the present application and now abandoned.

A principal object of this invention is to provide a method of making wire racks whereby such racks may be fabricated in substantially strip form before final assembly operations.

Another object of this invention is to provide a method of making dishwasher racks whereby substantially all fabricating operations may be performed by automatic machinery.

Further objects and advantages of this invention will become apparent as the following description proceeds, and the features of novelty which characterize the invention will be pointed out with particularity in the claims annexed to and forming a part of this specification.

Briefly stated, in accordance with one aspect of this invention there is provided a method of making dishwasher racks which includes the steps of fixedly attaching a plurality of groups of wire elements at spaced locations along a single continuous substantially straight piece of wire stock, and bending the wire stock at points between the groups of wire elements to form a peripheral support member enclosing the wire elements within an area generally defined by the peripheral support.

For a better understanding of this invention reference may be made to the following description and the accompanying drawing in which:

FIG. 2 is a top plan view of a dishwasher rack made in accordance with the present invention.

FIG. 3 is a front elevation view of the rack shown in FIG. 2, some of the parts being broken away to clarify the view.

FIG. 4 is a side elevation view of the same rack, with some parts similarly broken away.

FIG. 7 is a schematic top plan view of a portion of the rack shown in FIG. 2.

FIG. 8 is a schematic view of the same rack illustrating one step of the method of the present invention.

FIG. 9 is similar to FIG. 8 but illustrates another step.

FIG. 10 is similar to FIG. 8 but shows still another step of the method.

FIG. 11 is a schematic view of the rack shown in FIG. 5 and illustrating a step in the method of the present invention.

FIG. 12 is similar to FIG. 11 but illustrates a further step of the method.

FIG. 13 is similar to FIG. 12 but illustrates still another step of the method.

Figure 1:
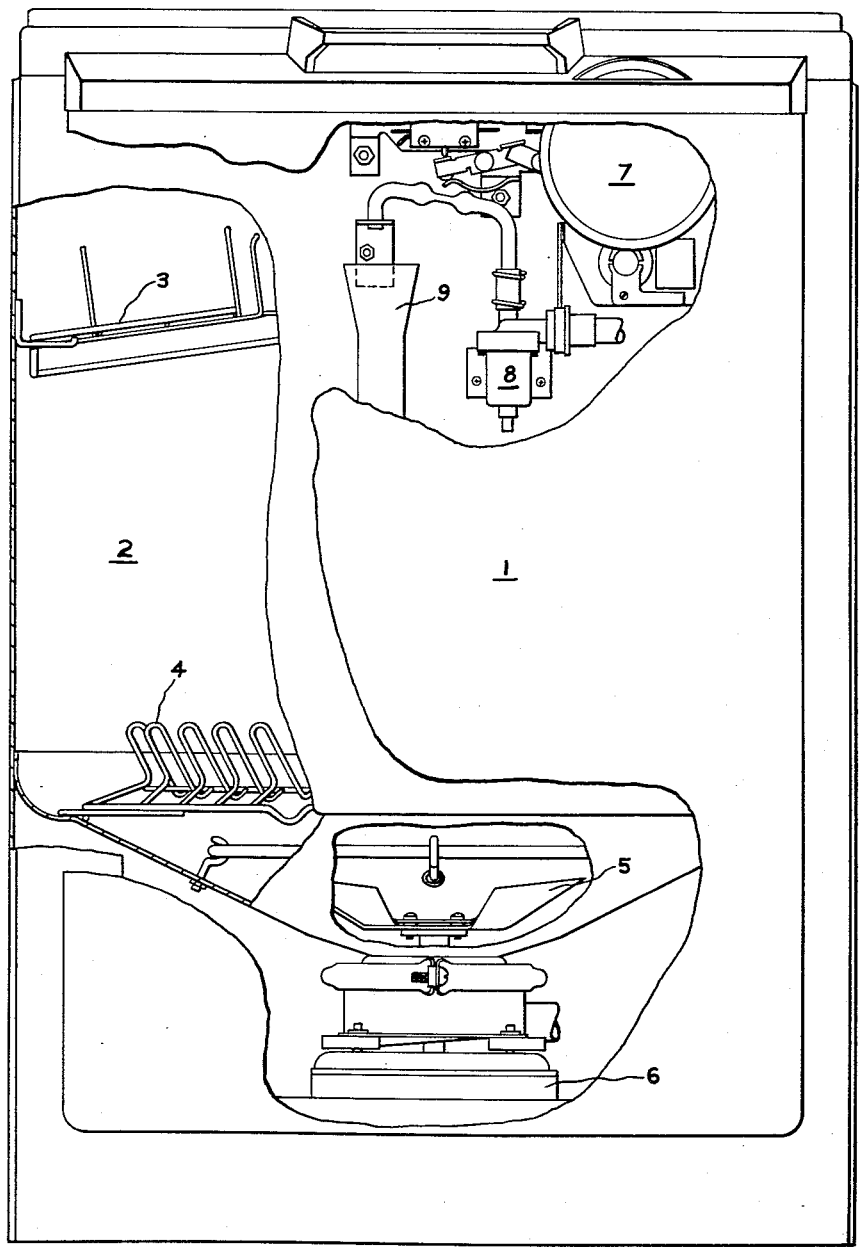
FIG. 1 is a front elevation view, with some of the parts broken away, of a dishwasher in which racks made in accordance with the present invention are supported.

Referring to FIG. 1 of the drawing, there is shown a dishwasher designated by the numeral 1 having an enclosed washing compartment 2 of generally rectangular configuration in which are mounted an upper rack 3 and a lower rack 4 constructed in accordance with the present invention. The dishwasher 1 includes a rotary impeller 5 located in the bottom of washing compartment 2 arranged to circulate washing fluid throughout the enclosed chamber, an impeller motor 6, a control assembly 7, a water inlet valve 8, and a water inlet tube 9. The structure of dishwasher 1 is briefly described herein merely to show the environment and utility of racks 3 and 4, but inasmuch as the present invention relates to the method of making such racks, it is considered that further description of the dishwasher structure is unnecessary.

Referring to FIGS. 2, 3 and 4, rack 3 comprises a peripheral support member 10 formed from a single piece of wire stock, a plurality of spaced apart groups of wire elements 11 fixedly attached at their ends to peripheral support member 10, and a plurality of inner support members 12 secured to wire elements 11. Preferably the joints between the various rack elements are made by a suitable welding process. In this embodiment of the invention the rack includes three groups of wire elements 11, these groups being identified by the numerals 13, 14, and 15 respectively. It will be observed that all of the wire elements 11 in group 13 are secured to straight portion 16 of peripheral support 10, that the wire elements 11 of group 14 are secured to straight portion 17 of support member 10, and that the wire elements 11 in group 15 are secured to the straight portion 18 of support member 10. As will be described below, the wire elements 11 in each of these groups are secured to support member 10 while it is in straight form and it is then bent at points between groups 13 and 14 and between groups 14 and 15 to form the parts as shown in FIG. 2.

Rack 3 may also be provided with upright supporting pins 19 formed on the ends of wire elements 11, and also vertical pins 20 fixedly secured, as by welding for example, to certain portions of inner support member 12. These elements are intended to support concave objects such as glasses, cups, bowls and the like, and may be formed by bending (pins 19) or welding (pins 20) operations either prior to or after assembly of wire elements 11 on peripheral support member 10. As shown in FIGS. 3 and 4, each of the three rack portions generally designated by the numerals 13, 14 and 15 are inclined slightly with respect to a horizontal plane, so as to better expose the objects supported thereon to the generally cone-shaped spray of washing fluid impelled upwardly in the dishwasher washing compartment by impeller 5.

Figure 5:
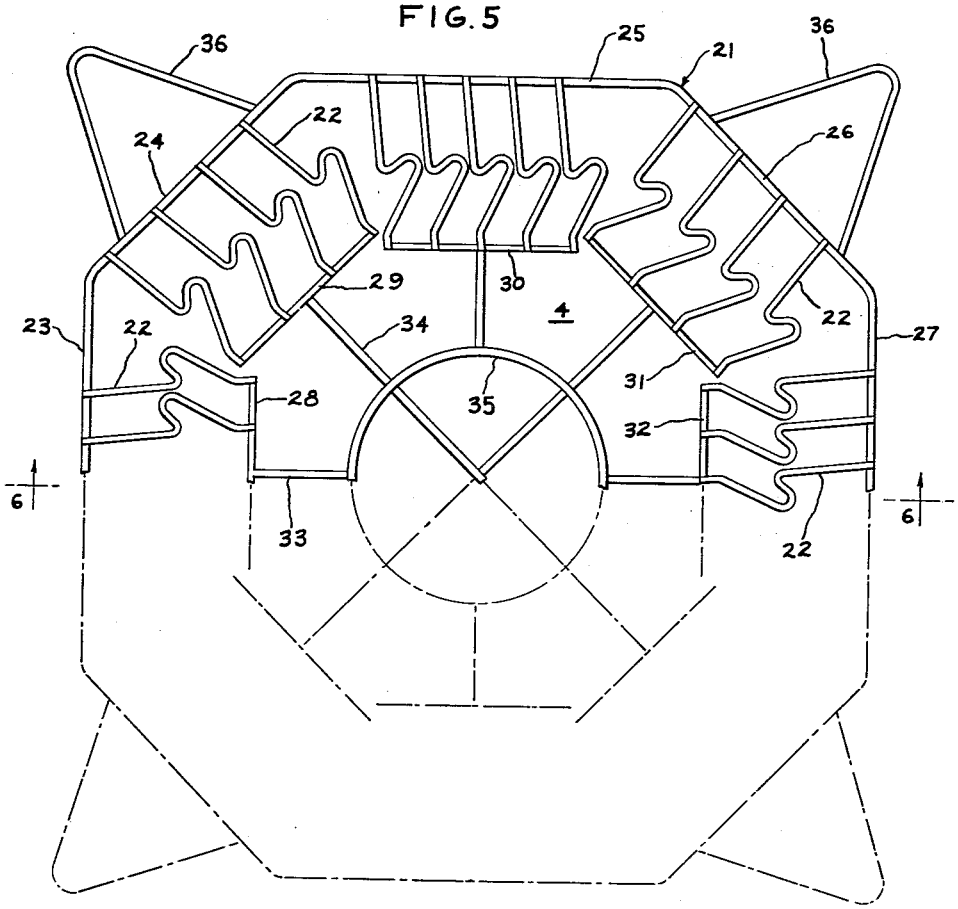
FIG. 5 is a top elevation view of another rack made in accordance with the present invention, only a portion of the rack being shown in full lines, however.
Figure 6:
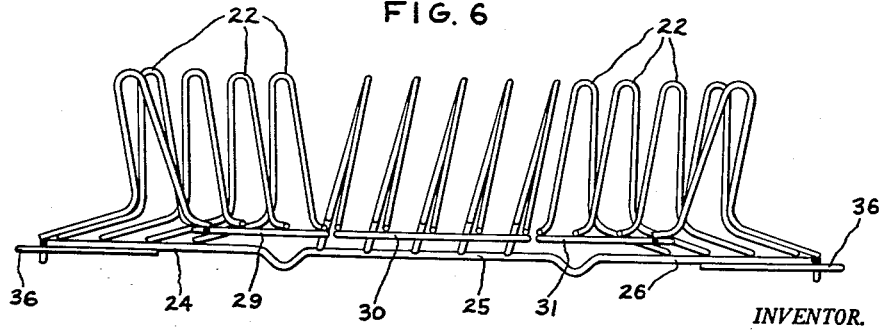
FIG. 6 is a sectional view taken along the line 6—6 of FIG. 5.

Referring to FIGS. 5 and 6 of the drawing, rack 4 comprises a peripheral support member 21 formed from a single piece of wire stock, and a plurality of spaced apart groups of wire elements 22 fixedly attached, by welding for example, at one end thereof to spaced straight portions 23, 24, 25, 26 and 27, etc., of peripheral support member 21. Wire elements 22 project toward the central portion of the rack and are generally parallel to the other elements in the same group. While only half of the rack is shown in FIG. 5, it will be understood that the broken lines indicate that the lower half is identical to the upper half, and that the rack is octagonal in shape. Thus in this embodiment of the invention there are eight groups of wire elements 22, including four groups having four wire elements therein and four alternately spaced groups having five wire elements therein. The inner ends of wire elements 22 of each group are secured together by an inner support member welded or otherwise secured to the free ends thereof, inner support members 28, 29, 30, 31, 32, etc., being formed from a piece of wire of a length substantially equal to the peripheral extent of the group of wire elements 22 to which they are attached, and arranged in generally parallel relation to the nearest portion of peripheral support member 21. Thus wire 28 is generally parallel to portion 23 of peripheral support 21, element 29 is generally parallel to straight portion 24, element 30 is generally parallel to straight portion 25, element 31 is generally parallel to straight portion 26 and element 32 is generally parallel to straight portion 27.

Rack 4 is also provided with four V-shaped wire supporting feet 36, each being attached and projecting outwardly from straight portion 24 of peripheral support member 21, and the other three alternately spaced straight portions of support member 21. Supporting feet 36 serve to locate rack 4 in the dishwasher tub, and also to provide support for the entire rack assembly, it being observed in FIG. 1 that these feet rest on a portion of the bottom wall of the washing compartment. It will be noted that the wire elements 22 attached to inner support member 29 and also those attached to inner support member 31 are spaced somewhat farther apart than the other wire elements of the rack, being designed to accommodate large plates which project into the corners of the washing compartment 2. Inasmuch as wire elements 22 in each group are arranged in parallel relationship, the plates supported thereby are also maintained in parallel relationship so that the spacing therebetween remains relatively large, so that maximum exposure to the washing fluid is obtained. In order to strengthen the rack structure, it is desirable to provide a central supporting grid, including radial arms 33 and 34 fixedly secured to a supporting ring 35 and projecting outwardly into engagement with inner support members 28, 29, etc.

Turning now to FIGS. 7-13 of the drawing, which illustrate the method of the present invention as applied to the manufacture of racks 3 and 4 illustrated in FIGS. 1-6, the method as applied to the manufacture of rack 3 will first be described. Initially, a number of rack portions as illustrated in FIG. 7 are fabricated, it being noted that this structure is made up of a group of wire elements 11 and support members 12 arranged in a grid like pattern, and that this structure lends itself to automatic fabrication. Thus, long strips of the structure shown in FIG. 7 may be made on automatic welding equipment and then cut into sections of appropriate lengths, such as the groups of wire elements designated by the numerals 13, 14 and 15 in FIG. 8. These rack portions are then welded at spaced locations to a straight length of wire stock, it being understood that only the adjacent free ends of wire elements 11 in each group are welded to the length of wire stock in this operation. The wire stock projecting beyond the ends of rack portions 13 and 15 are then cut off and bent to the positions shown in FIG. 8 so that they can be welded to the free ends of inner support members 12 thus forming the structure shown in FIG. 8. It will be noted that the piece of wire stock to which the rack structures are secured may now be identified as peripheral support member 10, and that the rack structures 13, 14 and 15 are spaced along this member so as to facilitate shaping of the support member 10, as shown in FIG. 9, in which member 10 is bent at a point between rack portions 13 and 14 so as to place the inner support members of the latter approximately perpendicular to those of the former. Straight portions 16 and 17 of peripheral support member 10 then lie at right angles to each other, and the shaping of the rack is completed by bending straight portion 18 to the position illustrated in FIG. 10. The free ends of inner support members 12 in rack portions 13 and 15 are then welded to the innermost inner support member of rack portion 14 and the ends of inner support members 12 of rack portion 14 are welded to peripheral support 10 to give the rack the necessary rigidity and strength. It will, of course, be understood that fingers 19 and 20 (FIG. 2) may be formed or added to each rack portion either after the rack has the configuration shown in FIG. 10, or alternatively, before each rack portion is welded to the piece of wire stock in the initial stage of manufacture.

As shown in FIGS. 11-13, the method of this invention may also be utilized in fabricating lower rack 4. In making this rack, wire elements 22 are arranged in groups, in parallel with each other, and are welded to peripheral support member 21 while it is in straight wire form, inner support members 28—32 being welded to the free ends of wire elements 22 as illustrated in FIG. 11 so as to form spaced rack portions attached to member 21. Alternatively, inner support members 28—32 may be assembled with wire elements 22 in groups, as shown, before these rack portions are welded to support member 21. The complete structure illustrated in FIG. 11 is then subjected to successive bending operations, the straight wire stock forming peripheral support member 21 being bent at points between each of the straight portions 23, 24, etc. This operation, which is shown in partial completed form in FIG. 12, may of course be performed on automatic machinery. After the complete octagonal structure has been formed, as illustrated in FIG. 13, the two free ends of peripheral support member 21 may be welded together to form a continuous outer support. Next, the central supporting grid, including wires 33 and 34 and ring 35 and also feet 36 may be welded in place to complete the manufacturing operation.

While I have shown and described certain embodiments of my invention, I do not desire the invention to be limited to the particular structures and methods disclosed, and I intend by the appended claims to cover all modifications within the true spirit and scope of the invention.

What I claim is:

1. The method of making a wire rack which comprises the steps of fixedly attaching a plurality of groups of wire elements at spaced locations along a single continuous substantially straight piece of wire stock, and bending said piece of wire stock at points between said groups of wire elements so as to enclose said wire elements within an area generally defined by said piece of wire stock and fixedly attaching the resulting structure together to form a rigid rack design.

2. The method of making a wire rack which comprises the steps of fixedly attaching a plurality of groups of wire elements at spaced locations along a single continuous substantially straight piece of wire stock, fixedly attaching a plurality of inner support members to said wire elements in generally parallel relation to the nearest portion of said wire stock, each of said inner support members being formed from a piece of wire of a preformed length substantially equal to the portion of said wire stock occupied by the group of wire elements to which it is attached, and bending said piece of wire stock at points between said groups of wire elements so as to enclose said wire elements within area generally defined by said piece of wire stock and fixedly attaching the resulting structure together to form a rigid rack design.

3. The method of making a wire rack which comprises the steps of fixedly attaching a plurality of groups of mutually parallel wire elements at spaced locations along a single continuous substantially straight piece of wire stock, fixedly attaching a plurality of inner support members to said wire elements in generally parallel relation to the nearest portion of said wire stock, each of said inner support members being preformed from a piece of wire of a length substantially equal to the portion of said wire stock occupied by the group of wire elements to which it is attached, bending said piece of wire stock at points between said groups of wire elements so as to enclose said wire elements within an area generally defined by said piece of wire stock, and fixedly attaching a preformed central supporting grid to a plurality of said inner support members to form a rigid rack design.

4. The method of making a wire rack which comprises the steps of fixedly attaching at least three rack portions at spaced locations along a single continuous substantially straight piece of wire stock, each of said rack portions being pre-assembled and including a plurality of wire elements generally parallel to said piece of wire stock, bending said piece of wire stock at points between said rack portions so as to enclose said rack portions within an area generally defined by said piece of wire stock and to locate the free ends of the wire elements of at least two of said rack portions adjacent an intermediate portion of one of the wire elements of a third rack portion, and fixedly attaching said free ends of said wire elements of said two of said rack portions to said one of the wire elements of said third rack portion.

5. The method of making a wire rack which comprises the steps of providing a continuous substantially straight piece of wire stock with a plurality of spaced groups of wire elements on one side thereof, and bending the wire stock at a point at each space between adjacent groups of wire elements so as to enclose said groups of wire elements within an area defined by said piece of wire stock, and fixedly attaching the resulting structure together to form a rigid rack design.

6. The method of making a wire rack which comprises the steps of providing a continuous substantially straight piece of wire stock with a plurality of spaced groups of rack portions on one side thereof, each rack portion having a plurality of intersecting wire elements, and bending said wire stock at a point in each space between adjacent groups of rack portions, and fixedly attaching the adjacent rack portions together to form a rigid rack structure.

References Cited in the file of this patent

UNITED STATES PATENTS

| | | |
|---|---|---|
| 181,639 | Carver | Aug. 29, 1876 |
| 813,499 | Johnson | Feb. 27, 1906 |
| 1,448,566 | Muller et al. | Mar. 13, 1923 |
| 1,985,407 | Green | Dec. 25, 1934 |
| 2,708,476 | Eames | May 17, 1955 |
| 2,825,481 | Glenny | Mar. 4, 1958 |
| 2,910,207 | Andrew | Oct. 27, 1959 |